US 8,411,576 B2

(12) United States Patent
Takasaki

(10) Patent No.: US 8,411,576 B2
(45) Date of Patent: Apr. 2, 2013

(54) ROUTE CONTROL SYSTEM AND ROUTE CONTROL METHOD IN A SWITCHING APPARATUS

(75) Inventor: Yoshinori Takasaki, Tokyo (JP)

(73) Assignee: Juniper Networks, Inc., Sunnyvale, CA (US)

( * ) Notice: Subject to any disclaimer, the term of this patent is extended or adjusted under 35 U.S.C. 154(b) by 4325 days.

(21) Appl. No.: 09/931,922

(22) Filed: Aug. 20, 2001

(65) Prior Publication Data

US 2002/0021660 A1 Feb. 21, 2002

(30) Foreign Application Priority Data

Aug. 18, 2000 (JP) .................................. 2000-248577

(51) Int. Cl.
*G01R 31/08* (2006.01)

(52) U.S. Cl. .............. 370/241.1; 370/243; 370/244; 370/245; 370/247; 370/248; 370/249; 370/251; 370/252; 370/236.2

(58) Field of Classification Search .......... 370/241–253, 370/229
See application file for complete search history.

(56) References Cited

U.S. PATENT DOCUMENTS

| | | | | |
|---|---|---|---|---|
| 5,974,046 A * | 10/1999 | Kim et al. | .................. | 370/241.1 |
| 6,167,025 A * | 12/2000 | Hsing et al. | .................. | 370/216 |
| 6,188,675 B1 * | 2/2001 | Casper et al. | .................. | 370/254 |
| 6,269,083 B1 * | 7/2001 | Nagata et al. | .................. | 370/248 |
| 6,347,073 B1 * | 2/2002 | Hiscock et al. | ............... | 370/217 |
| 6,643,269 B1 * | 11/2003 | Fan et al. | ....................... | 370/254 |
| 6,657,968 B1 * | 12/2003 | Emberty et al. | ............... | 370/242 |
| 6,876,625 B1 * | 4/2005 | McAllister et al. | ............ | 370/221 |
| 2002/0005131 A1 * | 1/2002 | Yoshizawa et al. | ......... | 101/415.1 |
| 2002/0021670 A1 * | 2/2002 | Shimada | ........................ | 370/242 |

FOREIGN PATENT DOCUMENTS

| | | |
|---|---|---|
| EP | 0 777 401 | 6/1997 |
| JP | 7-250076 | 9/1995 |
| JP | 9-181735 | 7/1997 |
| JP | 9-214498 | 8/1997 |

OTHER PUBLICATIONS

Telecommunication Standardization Sector of ITU: "ITU-T Recommendation 1.610", XP-002085435, Integrated Services Digital Network (ISDN), Nov. 1, 1995, pp. 1-46.

* cited by examiner

*Primary Examiner* — Christopher Grey
(74) *Attorney, Agent, or Firm* — Harrity & Harrity, LLP

(57) ABSTRACT

A route monitor control system includes a plurality of OAM cell handlers (OCHs); a plurality of virtual path handlers (VPHs); a plurality of virtual channel handlers (VCHs); trunks; and a control unit. The control unit issues an OAM (operation and maintenance) cell send instruction to a specific one of the plurality of OAM cell handlers, and carries out a loop back control to at least one of the virtual path handler, the virtual channel handler, and the trunk, which are associated with the specific OAM cell handler, as an object unit in response to the OAM cell send instruction. Also, when the specific OAM cell handler sends out an OAM cell from the specific OAM cell handler to the object unit in response to the OAM cell send instruction, the control unit determines a fault position based on returning or non-returning of the OAM cell from the object unit to the specific OAM cell handler.

20 Claims, 1 Drawing Sheet

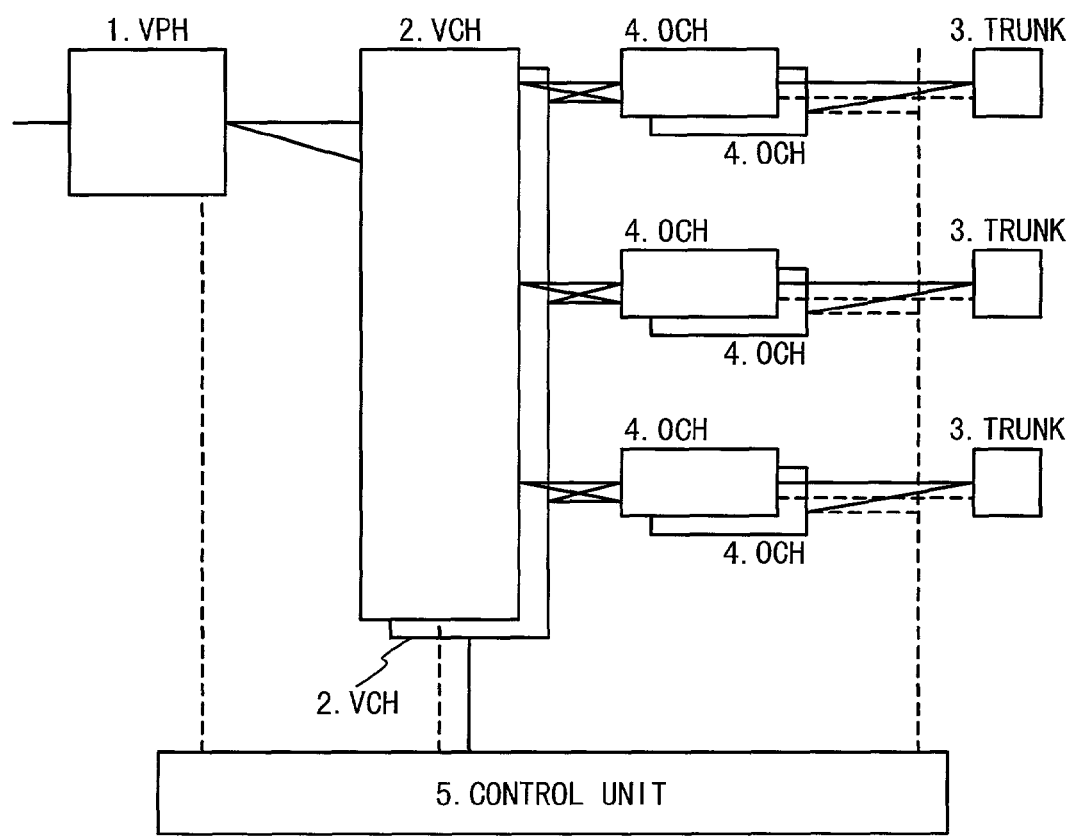

ROUTE CONTROL SYSTEM AND ROUTE CONTROL METHOD IN A SWITCHING APPARATUS

BACKGROUND OF THE INVENTION

1. Field of the Invention

The present invention relates to a route monitor control system which monitors an ATM (Asynchronous Transfer Mode) switching apparatus, and a route monitor control method.

2. Description of the Related Art

In recent years, a variety of services supported by an ATM switching apparatus are required due to the rapid spreading of the market for the ATM switching apparatus. Therefore, various types of hardware are installed into the ATM switching apparatus to provide the variety of services and a service function of each type of hardware is extended.

On the other hand, in the quality verification of these hardware functions, after a maintenance person recognizes a kind of hardware to be verified, a maintenance command is given to carry out a conductiveness test between a trunk and a node by a monitoring apparatus installed in or out of the system.

However, because a managing method is different for every system in such a conventional route monitor control system, professional knowledge for maintenance operations for every system is needed.

In conjunction with the above description, a test system of an ATM switching apparatus is disclosed in Japanese Laid Open Patent application (JP-A-Heisei 9-214498). In this reference, an ATM switching system is composed of the ATM switching apparatus, a maintenance console, and a test apparatus. A package test control section is provided in the ATM switching apparatus. When the package of a communication route unit is installed, the package test control section detects from a signal outputted the installation of the package from the package, and specifies a kind of the package.

SUMMARY OF THE INVENTION

The present invention is accomplished in view of above problem. Embodiments of the invention provide a route monitor control system in which a monitoring apparatus for performing a maintenance operation does not require professional knowledge special to the monitoring apparatus, a route monitor control method and a recording medium.

In an aspect of the present invention, a route monitor control system includes a plurality of OAM cell handlers (OCHs); a plurality of virtual path handlers (VPHs); a plurality of virtual channel handlers (VCHs); trunks; and a control unit. The control unit issues an OAM (operation and maintenance) cell send instruction to a specific one of the plurality of OAM cell handlers, carries out a loop back control to at least one of the virtual path handler, the virtual channel handler, and the trunk, which are associated with the specific OAM cell handler, as an object unit in response to the OAM cell send instruction, and when the specific OAM cell handler sends out an OAM cell from the specific OAM cell handler to the object unit in response to the OAM cell send instruction, determines a fault position based on returning or non-returning of the OAM cell from the object unit to the specific OAM cell handler.

Here, the control unit may carry out a switching operation of a route from the virtual path handler to the trunk for fault avoidance based on the determining fault position.

Also, the plurality of OAM cell handlers, the plurality of virtual path handlers, the plurality of virtual channel handlers, the trunks, and the control unit may be contained in an ATM (asynchronous transfer mode) switching apparatus.

Also, it is desirable that the control unit periodically issues the OAM cell send instruction to the specific OAM cell handler.

Also, the control unit may carry out the loop back control to all of the virtual path handler (VPH), the virtual channel handler (VCH), and the trunk, which are associated with the specific OAM cell handler, as the object units in response to the OAM cell send instruction, and when the specific OAM cell handler sends out the OAM cells to the object units in response to the OAM cell send instruction, may determine the fault position based on returning or non-returning of each of the OAM cells from the object unit to the specific OAM cell handler.

Also, the control unit may carry out the issuing operation, the loop back control and the determining operation while changing the specific OAM cell handler among the plurality of OAM cell handlers.

In another aspect of the present invention, a route monitor control method is attained: by (a) issuing an OAM (operation and maintenance) cell send instruction to a specific one of a plurality of OAM cell handlers (OCHs); by (b) carrying out a loop back control to at least one of a virtual path handler (VPH), a virtual channel handler (VCH), and a trunk, which are associated with the specific OAM cell handler, as an object unit in response to the OAM cell send instruction; by (c) sending out an OAM cell from the specific OAM cell handler to the object unit in response to the OAM cell send instruction; and by (d) determining a fault position based on returning or non-returning of the OAM cell from the object unit to the specific OAM cell handler.

Also, the route monitor control method may further include the step of: carrying out a route switching operation for fault avoidance based on the determining fault position.

Also, the object unit is contained in an ATM (asynchronous transfer mode) switching apparatus.

Also, the virtual path handler (VPH), the virtual channel handler (VCH), and the trunk, and the specific OAM cell handler are contained in an ATM (asynchronous transfer mode) switching apparatus.

Also, the (a) issuing step may be attained by periodically issuing the OAM cell send instruction to the specific OAM cell handler.

Also, the loop back control is carried out to all of the virtual path handler (VPH), the virtual channel handler (VCH), and the trunk as the object units in response to the OAM cell send instruction, and the OAM cells may be sent out from the specific OAM cell handler to the object units in response to the OAM cell send instruction.

BRIEF DESCRIPTION OF THE DRAWINGS

FIG. 1 is a block diagram showing the structure of a route monitor control system of the present invention.

DESCRIPTION OF THE PREFERRED EMBODIMENTS

Hereinafter, a route monitor control system in an ATM switching apparatus of the present invention will be described below with reference to the attached drawings.

FIG. 1 is a block diagram showing the structure of the route monitor control system according to an embodiment of the present invention. As shown in FIG. 1, the route monitor control system in the embodiment is composed of a plurality of virtual path handler (VPHs) 1, a plurality of virtual channel handlers (VCHs) 2, a plurality of trunks 3, a plurality of OAM cell handlers (OCHs) 4 and a control unit 5. Also, the virtual path handlers (VPHs) 1, the virtual channel handlers (VCHs) 2, the trunks 3, the OAM cell handlers (OCHs) 4 and the control unit 5 are provided in an ATM switching apparatus.

The virtual path handler (VPH) 1 relays a virtual path (VP). The virtual channel handler (VCH) 2 relays a virtual channel (VC). The trunk 3 is a unit for the termination of the VC. The OAM cell handler (OCH) 4 processes a F4 flow and a F5 flow in an ATM layer, and is a monitor which carries out a loop back test to the virtual path handler (VPH) 1, the virtual channel handler (VCH) 2, and the trunk 3, which are associated with the OAM cell handler 4, and sends out OAM cells to them. Thus, the monitor of the sent OAM cells is carried out. The control unit 5 controls the virtual path handlers (VPHs) 1, the virtual channel handlers (VCHs) 2, the trunks 3 and the OAM cell handlers (OCHs) 4. Also, the control unit 5 issues an instruction to a specific one of the OAM cell handlers (OCHs) 4 which is provided at a predetermined position. As a result, the specific OAM cell handler (OCH) 4 operates as a starting point of the OAM cell sending-out, and receives the OAM cell returned to the specific OAM cell handler 4 through a loop route. Thus, a fault route in the ATM switching apparatus can be determined, and the control unit 5 carries out a switching control in the route based on the reception or non-reception of the returned OAM cell. In this way, in the loop back test, an OAM cell is sent out along a predetermined route, and the route is checked based on the reception or non-reception of the sent out OAM cell.

Next, an operation of the route monitor control system of the present invention will be described below with reference to FIG. 1.

First, the control unit 5 instructs a specific OAM cell handler (OCH) 4 of a plurality of OAM cell handler (OCHs) 4 to send out an OAM cell. Also, the control unit 5 controls the specific OAM cell handler (OCH) 4 to carry out a loop back control to the virtual path handler (VPH) 1, the virtual channel handler (VCH) 2 and the trunk 3, which are associated with the specific OAM cell handler (OCH) 4, as a monitoring object.

Next, the specific OAM cell handler (OCH) 4 periodically transmits OAM cells to the virtual path handler (VPH) 1, the virtual channel handler (VCH) 2 and the trunk 3, in response to the instruction to monitor that the OAM cells are sent back to the specific OAM cell handler (OCH) 4 through loops. The specific OAM cell handler (OCH) 4 notifies the monitoring result to the control unit 5.

Lastly, the control unit 5 specifies or determines a fault portion based on the monitoring result notified from the specific OAM cell handler (OCH) 4 and carries out a fault avoidance control such as the switching of a route in the ATM switching apparatus.

In the route monitor control system of the described present invention, an OAM cell handler (OCH) 4 is specified as a starting point for sending out an OAM cell. However, the control unit 5 operates in such a manner that a plurality of OAM cell handlers (OCHs) 4 may operate as the starting points sending out OAM cells at a time or sequentially. That is, by setting a plurality of starting points for monitoring the routes of the ATM switching apparatus, the load to monitor the ATM switching apparatus can be distributed.

Also, the OAM cell handler (OCH) 4 may be not an independent unit and may be incorporated into the virtual path handler (VPH) 1, the virtual channel handler (VCH) 2, or the trunk 3.

Moreover, the trunk 3 may be TE (Terminal Equipment) as the unit which carries out the relay of VC.

As described above, according to the route monitor control system of the present invention, the OAM cell in the ATM is loop-backed in the ATM switching apparatus as a monitoring object. Therefore, the existing ATM technique can be used for the monitor control in the ATM switching apparatus. Therefore, without needing the knowledge special to the monitor control of the ATM switching apparatus, it is possible to simply carry out a maintenance operation of the monitor control.

What is claimed is:

1. A route monitor control system comprising:
   a plurality of OAM cell handlers (OCHs);
   a plurality of virtual path handlers (VPHs);
   a plurality of virtual channel handlers (VCHs);
   a plurality of trunks; and
   a control unit configured to:
      issue an OAM (operation and maintenance) cell send instruction to a first one of said plurality of OAM cell handlers,
      control said first OAM cell handler to carry out a loop back control test to at least one of said virtual path handlers, at least one of said virtual channel handlers, and at least one of said trunks, which are associated with said first OAM cell handler in response to said OAM cell send instruction, and
   when said first OAM cell handler sends out an OAM cell in response to said OAM cell send instruction, determine a fault position based on returning or non-returning of the OAM cell to said first OAM cell handler.

2. The route monitor control system according to claim 1, wherein said control unit is further configured to:
   carry out a switching operation of a route from at least one of said virtual path handlers to at least one of said trunks for fault avoidance based on the determined fault position.

3. The route monitor control system according to claim 1, wherein said plurality of OAM cell handlers, said plurality of virtual path handlers, said plurality of virtual channel handlers, said plurality of trunks, and said control unit are contained in an ATM (asynchronous transfer mode) switching apparatus.

4. The route monitor control system according to claim 1, wherein said control unit is further configured to:
   periodically issue said OAM cell send instruction to said first OAM cell handler.

5. The route monitor control system according to claim 1, wherein said control unit is configured to:
   determine the fault position based on returning or non-returning of each of the OAM cells to said first OAM cell handler.

6. The route monitor control system according to claim 1, wherein said control unit is configured to:
   carry out the issuing operation, the loop back control test and the determining operation while changing said first OAM cell handler among said plurality of OAM cell handlers.

7. A route monitor control method comprising:
   issuing an OAM (operation and maintenance) cell send instruction to a specific one of a plurality of OAM cell handlers;
   carrying out a loop back control test to at least one of a plurality of path handlers, at least one of a plurality of channel handlers, and a trunk, which are associated with said specific OAM cell handler, in response to said OAM cell send instruction;

sending out an OAM cell from said specific OAM cell handler in response to said OAM cell send instruction; and determining a fault position based on returning or non-returning of the OAM cell to said specific OAM cell handler.

8. The route monitor control method according to claim 7, further comprising:

carrying out a route switching operation for fault avoidance based on the determined fault position.

9. The route monitor control method according to claim 7, wherein said carrying out a loop back control test is performed in an ATM (asynchronous transfer mode) switching apparatus.

10. The route monitor control method according to claim 7, wherein said path handlers, said channel handlers, said trunk, and said specific OAM cell handler are contained in an ATM (asynchronous transfer mode) switching apparatus.

11. The route monitor control method according to claim 7, wherein said issuing comprises:

periodically issuing said OAM cell send instruction to said specific OAM cell handler.

12. The route monitor control method according to claim 7, wherein said carrying out comprises:

carrying out said loop back control test to all of said path handlers, said channel handlers, and said trunk in response to said OAM cell send instruction, and said sending out comprises:

sending out OAM cells from said specific OAM cell handler in response to said OAM cell send instruction.

13. A system, comprising:
a plurality of testing devices;
a plurality of path handlers;
a plurality of channel handlers;
a plurality of trunks; and
a control unit configured to:

issue an instruction to a first one of the plurality of testing devices, the instruction indicating that the first testing device is to perform a loopback control test, wherein the first testing device is configured to:
receive the instruction,
send test data to at least one of the path handlers, channel handlers or trunks in response to the instruction,
receive back at least some of the test data, and
forward results of the loopback control test to the control unit, wherein the control unit is further configured to:
identify a fault based on the forwarded results.

14. The system of claim 13, wherein the control unit is configured to periodically issue the instruction to the first testing device.

15. The system of claim 13, wherein when forwarding results, the first testing device is configured to:

forward information to the control unit based on return of the test data to the first testing device.

16. The system of claim 15, wherein when identifying a fault, the control unit is configured to identify the fault based on the forwarded information.

17. The system of claim 13, wherein the control unit is further configured to:

perform a fault avoidance operation based on the identified fault.

18. The system of claim 13, wherein the control unit is configured to forward loopback control test initiation instructions to the plurality of the testing devices.

19. The system of claim 13, wherein the plurality of testing devices may be included in the plurality of path handlers, the plurality of channel handlers or the plurality of trunks.

20. The system of claim 13, wherein the plurality of path handlers, the plurality of channel handlers and the plurality of trunks are contained in a single switching apparatus.

* * * * *